Jan. 1, 1929.  
H. T. STOKES  
RADIATOR SHUTTER  
Filed Sept. 1, 1927
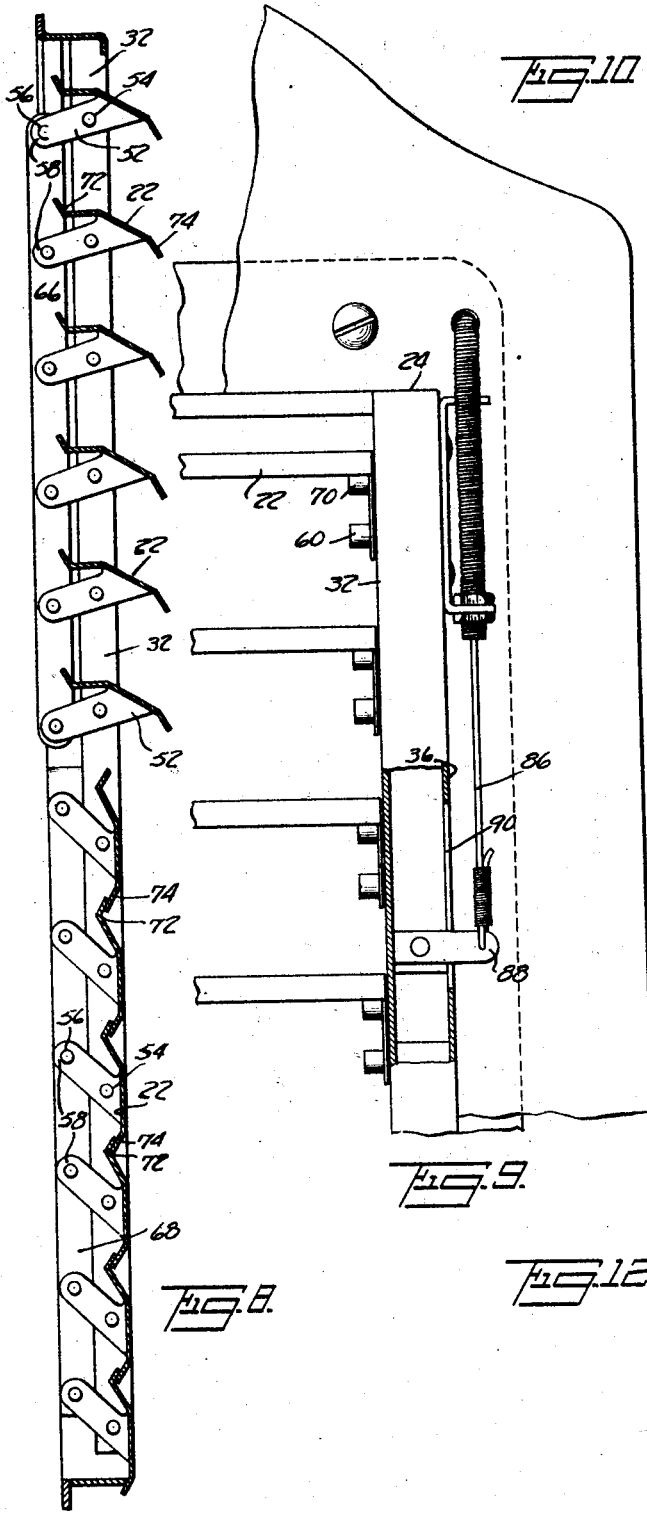
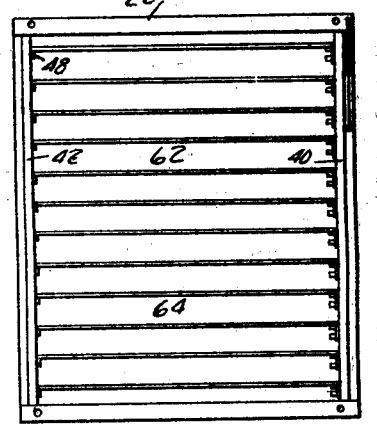
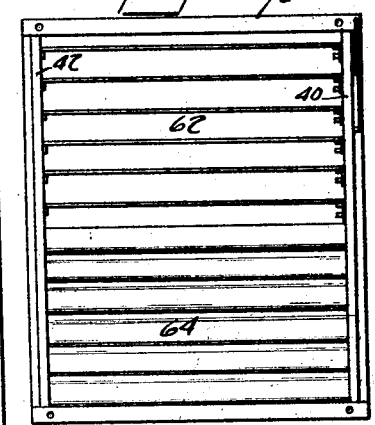
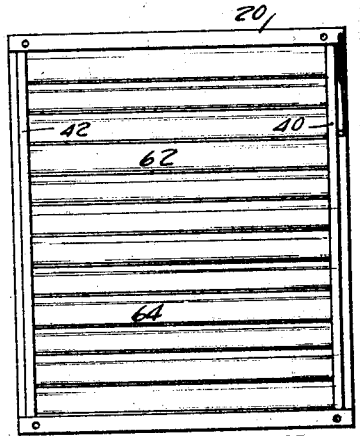
INVENTOR  
Harlow T. Stokes  
BY Dyke and Dehaines  
ATTORNEYS.

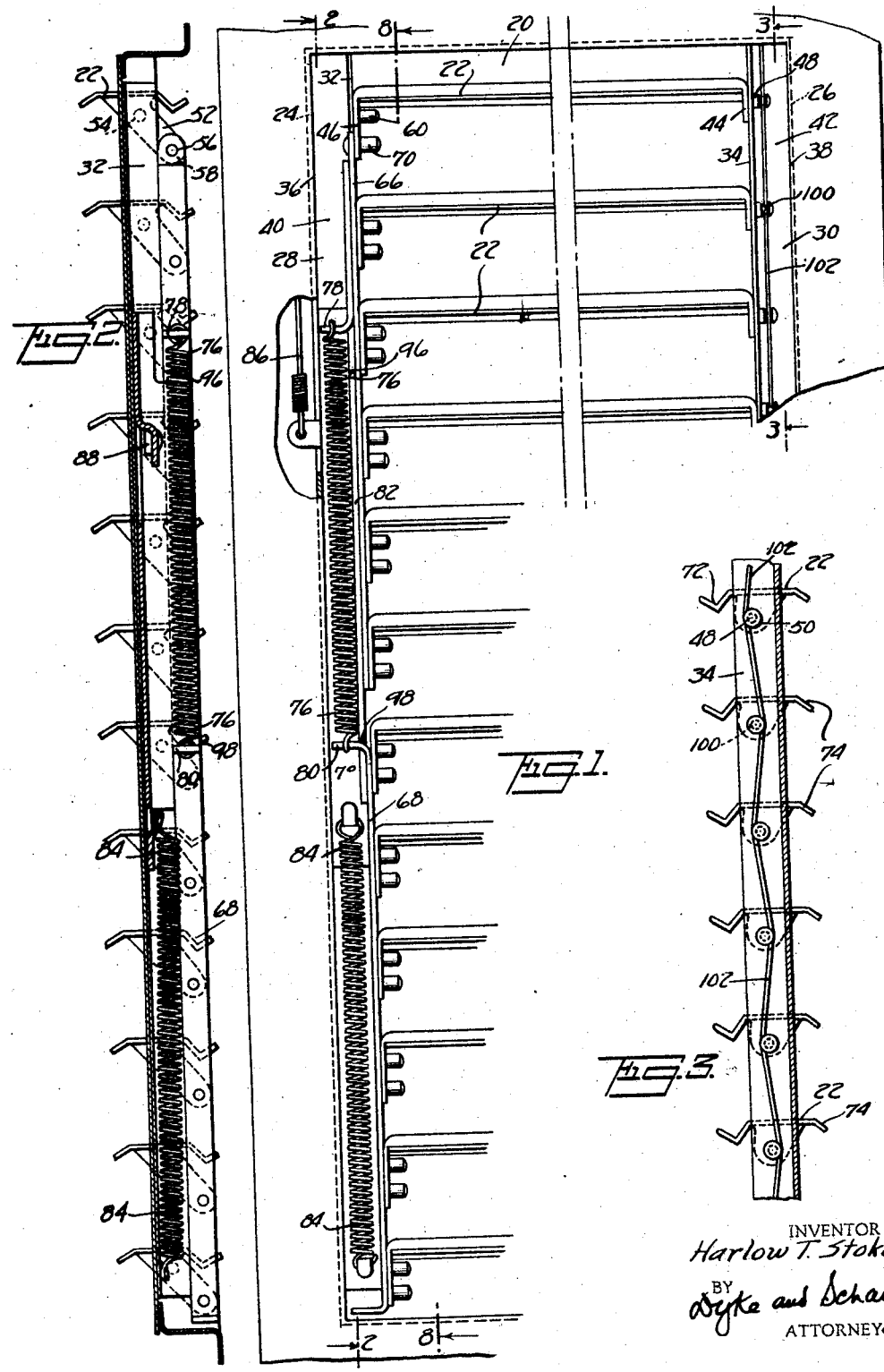

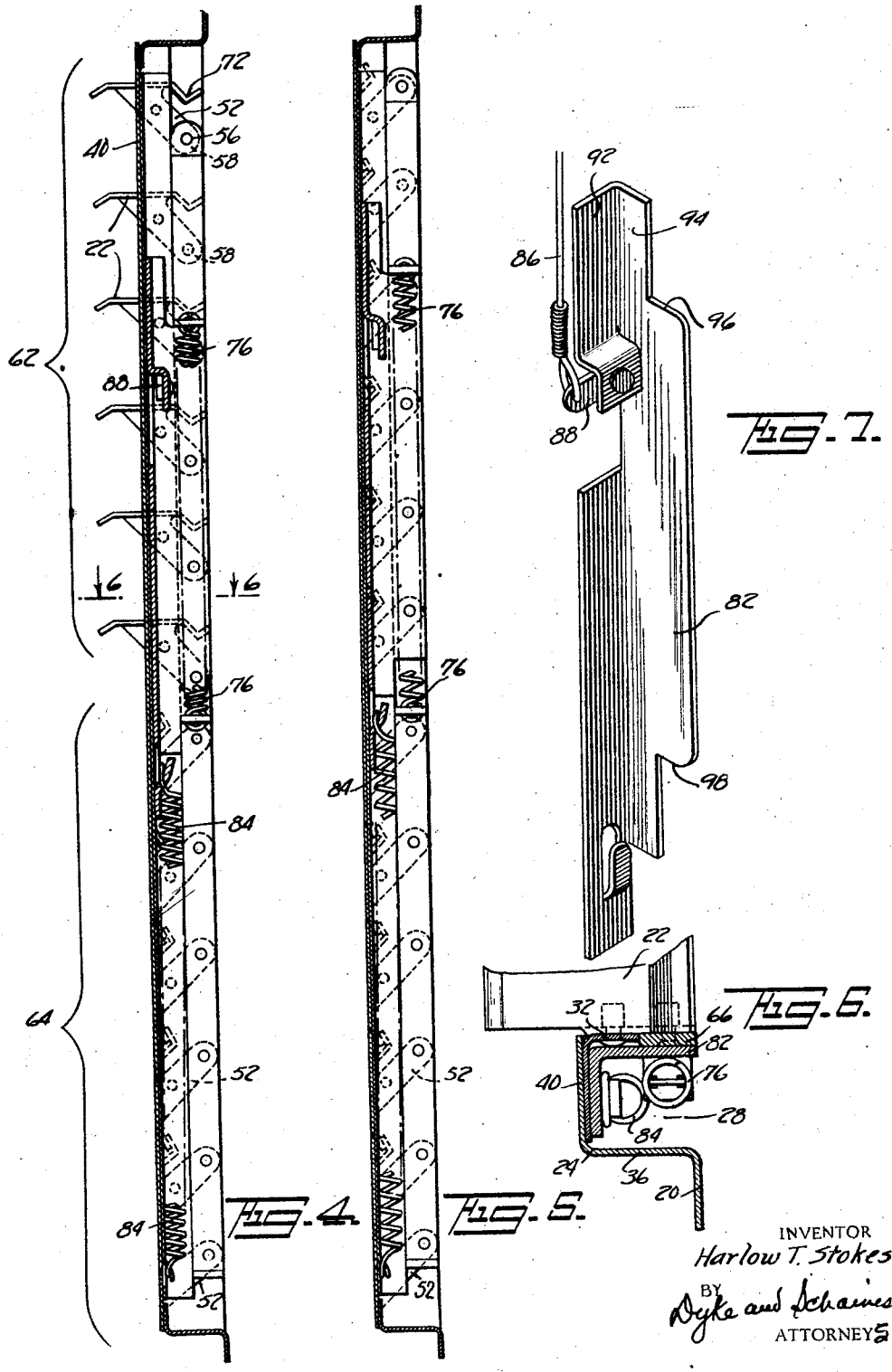

Patented Jan. 1, 1929.

1,697,149

UNITED STATES PATENT OFFICE.

HARLOW T. STOKES, OF BROOKLYN, NEW YORK, ASSIGNOR TO METAL STAMPING COMPANY, OF LONG ISLAND CITY, NEW YORK, A CORPORATION OF NEW YORK.

RADIATOR SHUTTER.

Application filed September 1, 1927. Serial No. 216,852.

My invention relates to radiator shutters, and particularly to automobile radiator shutters of the type in which the shutter slats are operated in groups.

A radiator shutter which permits of having a lower section or sections partially or completely closed, while an upper section or sections are completely or partially opened, is preferable to the type in which all the shutter-slats are opened and closed simultaneously and in such manner that if any portion of the shutter is partially or completely open the entire shutter is uniformly open to an equal degree.

With such a multi-section, preferably a two-section, shutter, the possibility of freezing and damage to the lower part of the radiator is minimized by the possibility of closing this part separately, while a sufficient air circulation is at the same time permitted through the open upper part. The upper part also can be closed in severe weather, or in warmer weather both parts can be open.

The principal object of the invention is the provision of simpler and more efficient control means for operating such groups of shutter-slats than has hitherto been available, in order that this superior type of radiator shutter may be more satisfactory in use.

Another object consists in locating the operating mechanism in channels of the shutter frame where it is protected and out of the way and permits the shutter to be installed close up to the surface of the radiator.

The drawings illustrate an embodiment of my invention shown merely for the purpose of illustration and for affording an understanding of my invention, and not for limitation thereof, and it is to be understood that changes and modifications may be resorted to within the scope of my claims without departing from the spirit or scope of my invention. In said drawings:

Fig. 1 is a fragmentary rear elevational view of a two-section radiator shutter in accordance with my invention, showing both sections of shutter vanes in open position.

Fig. 2 is a cross-sectional view of a radiator shutter taken on the line 2—2, Fig. 1.

Fig. 3 is a cross-sectional view on the line 3—3, Fig. 1, showing the means for preventing rattling of the shutter vanes.

Fig. 4 is a cross-sectional view of a radiator shutter, similar to Fig. 2, but showing the top section of shutter vanes in open position and the lower section of shutter vanes in closed position.

Fig. 5 is a cross-sectional view of a radiator shutter, showing both sections of shutter vanes in closed position.

Fig. 6 is a cross-sectional view on the line 6—6, Fig. 4.

Fig. 7 is a perspective view of the slidebar for operating the sections of shutter vanes.

Fig. 8 is a sectional view taken approximately on the line 8—8, Fig. 1, with top shutter section partially and bottom section completely closed.

Fig. 9 is a fragmentary front elevational view showing the connection of the operating cable to the slidebar for operating the shutter sections, and Figs. 10, 11 and 12 are front elevational views showing respectively the shutter with both sections open, top section open and bottom section closed, and both top and bottom sections closed.

Reference character 20 designates the radiator shutter frame, which is provided with a plurality of pivoted vanes or slats 22 extending horizontally across the frame, and with housings in the vertical or side members of the frame for housing the shutter vane operating mechanism and the shutter vane anti-rattling mechanism. In the embodiment of the invention illustrated in the drawings, said housing means comprise two vertical channel members 24, 26, one on each side of the frame 20 and running from the top to the bottom of the frame. These channel members 24, 26 contain channels or grooves 28, 30, which are open at the back of the shutter and receive or house the mechanism for operating the shutter vanes and the shutter vane anti-rattling mechanism respectively. All the shutter parts are preferably made of sheet metal.

The inner walls of said channel members 24, 26 are made up of flanges 32, 34, respectively, which flanges 32, 34 are approximately half the width of the outer walls 36, 38 of the channel members 24, 26. The channel members 24, 26 also comprise the connecting walls 40, 42, which constitute the vertical front walls of the radiator shutter frame and are substantially flush with the outer surfaces of the shutter vanes 22, when said vanes are in fully closed or vertical position.

The shutter vanes 22 in swinging from open to closed position move from a substantially horizontal to a substantially vertical plane. Said vanes 22 are positioned between the said flanges 32, 34 and are journaled to pivot therein. The vanes 22 are provided on their ends 44 with pivot pins or journals 48 of circular cross-section located about midway between the edges of the vanes. Said pivot pins 48 are received and pivot in circular apertures 50 provided in flange 34. The opposite ends 46 of vanes 22 are provided with rearwardly extending crank arms 52, and each arm 52 is provided with two circular apertures 54, 56, apertures 54 being positioned about midway between the edges of the vanes and substantially longitudinally opposite their pivot pins 48 on the opposite ends 44 of the vanes, and apertures 56 being positioned adjacent the tips 58 of the crank arms 52. The pivotal mounting of the vane ends 46 on the flange 32 is obtained by providing flange 32 with bosses 60 of circular cross-section adapted to pivotally support the ends 46 of the vanes by entering the vane apertures 54.

In the radiator shutter shown in the drawing, twelve of the vanes 22 are provided, which are divided into two groups or sections of six vanes each, section 62 being located in the upper half of the shutter frame 20, and section 64 in the lower half of the shutter frame. If desired, a greater or lesser number of vanes may be provided, and they may be divided into any number of sections, each section comprising any number of vanes desired. The vanes in the upper section are connected to turn together by a link 66 provided with journal bosses 70, which are pivotally received in openings 56 in the vane crank arms 52, and the vanes in the lower section are pivotally connected to turn together by the similar link 68. The length of crank arms 52 is such that links 66, 68 rest against flange 32 when shutter-slats 22 are in vertical or completely closed position, and again rest against said flange 32 when shutter-slats 22 are in horizontal or completely open position. In this way stops are provided for each position of the shutter vanes by links 66 and 68 coming to rest against flange 32.

The individual vanes are made wide enough to lap over somewhat when closed, and in order to insure their being weather tight, a shallow groove 72 is formed in each vane, adjacent to that edge which is uppermost in closed position, and the opposite margin of each vane is bent back to form a narrow flange 74 which, when the vanes are closed, enters the groove 72 of the adjacent vane below to form a sort of tongue and groove overlap.

If desired, one or both of the overlapping surfaces may be covered or lined with felt or the like to make a tighter closure.

The upper section 62 and lower section 64 are spring coupled together, as by means of a relatively long coil spring 76, which in the form shown is hooked over lugs 78 and 80 formed on the link 66 of the upper section 62 and on the link 68 of the lower section 64, respectively.

Spring 76, as well as the other parts of the operating mechanism, is received in channel 28.

The sections so spring connected together are urged by the spring 76 to turn in opposite directions, and when subject to the pull of spring 76 only, the vanes 22 of the upper section 62 open until stopped by flange 32, while the vanes of the lower section 64 close and are stopped in closed position also by the stop flange 32.

Manually operated means are provided for removing the vanes of the several sections to other positions than the position just described with the top section open and the lower section closed. The operating means preferably comprises a pull handle working against an expansion spring so as to secure certainty of movement in each direction.

In the construction shown, a slide bar 82 is mounted to slide in the channel 28 and is pulled down by spring 84, also located in the channel 28, and can be pulled upwardly by the cable 86 to which a control handle can be attached. The cable may be attached to the lug 88 formed in the slidebar 82 and extending through a slot 90 in the outer wall 36 of the channel member 24.

Slidebar 82 is preferably an angle bar comprising web 92 and flange 94, said flange 94 being provided with top and bottom shoulders 96 and 98, adapted to engage and coact respectively with the lug 78 of link 66 of the vane section 62, and the lug 80 of link 68 of the vane section 64.

When the control cable is released and slidebar 82 is held downwardly by its spring 84, the vanes of lower section 64 are open, the pull of spring 84 being transmitted to the vanes of section 64 by the shoulder 98 of slidebar 82, lug 80 and link 68. Spring 84 is stronger than spring 76, and while turning movement of the vanes 22 of section 64 is resisted by the spring 76, this resistance is overcome, spring 76 being elongated while spring 84 contracts.

Upon retracting the control cable 86, slide bar 82 is raised, and spring 84 is elongated, while spring 76 is permitted to contract. At the same time, the shoulder 98 at the lower end of slidebar 82 backs off upwardly from its engagement with lug 80 of link 68 and permits the vanes of the lower section 64 to be turned to closed position by the section connector spring 76. Further retraction of control cable 86 and upward movement of slidebar 82 and resulting upward movement of link 66 by shoulder 96 acting upon lug 78 of link 66 produces a closing movement of vanes 22 of upper section 62, spring 76 being stretched as link 66 is raised.

If the manual movement of the control cable be halted and the cable locked in a position substantially intermediate between its two extreme positions so that the slidebar 82 does no operate to close the upper or open the lower section, the vanes of the two sections retain their positions as first described above, with the vanes of upper section 62 open and those of lower section 64 closed.

Thus with the control cable released both sections are fully opened. With the control cable completely retracted both sections are fully closed, and various intermediate conditions can be obtained, including closed position of the bottom section with the top section partially or completely open, depending upon weather requirements.

In order to prevent rattling of the shutter vanes in all the positions to which they may be moved, the vane pivot pins 48 journaled in and projecting through flange 34 are provided with annular grooves 100, and a tensioning member, such as a spring wire 102, is passed in front of and behind alternate pins of the series and retained in place by being received in the grooves 100, as shown in Figs. 1 and 3. The tension of the spring wire 102, while not sufficient to prevent the pivotal turning of the vanes 22 in the frame 20, prevents rattling of the vanes in their bearings 50. The arrangement of springs 76 and 84 is such that one or both is always under tension and thus at this end also all looseness and rattling of the slats are prevented.

I claim:

1. A radiator shutter having pivotally mounted vanes, two links attached to said vanes adapting them to turn in two sections, a spring connecting said links, and a slidebar for controlling the movement of said links, said slidebar adapted to be manually moved in one direction, and spring means for returning same.

2. A radiator shutter having its vanes arranged to turn in two sets, means normally tending to move the vanes of one set to closed position and the vanes of the other set to open position, and vane turning means serving when actuated in one direction to turn the vanes of one set and when actuated in the opposite direction to turn the vanes of the other set.

3. A radiator shutter having pivoted vanes linked together to turn in sections, and spring means connected to and acting on said sections for imparting turning movement thereto in such manner as to tend to move one section of vanes to a closed position and the other section to an open position.

4. In a radiator shutter, a frame, vanes pivoted in the frame, links connecting the vanes in a plurality of sections, and a pull spring arranged between and connecting links of adjacent sections in such manner as to tend to move one section of vanes to a closed position and the other section to an open position.

5. A radiator shutter comprising a plurality of movable sections, means normally tending to move one section to closed position and the other section to open position, and means for actuating said sections.

6. A radiator shutter having vanes arranged to turn in two linked-together sections, spring means normally tending to move the lower section to closed position and the upper section to open position and manually operable means to turn the vanes of either section into other than said normal position.

7. A radiator shutter comprising a plurality of movable sections, spring means tending to move said sections to certain of the positions thereof, and an actuating member therefor movable in opposite directions intermediate of said sections; said actuating member being movable in one direction to release one of said sections to permit of the spring actuation thereof and to positively actuate the other of said sections in opposition to the spring means acting thereon, and in the opposite direction to release and actuate said sections in inverse order.

8. A radiator shutter comprising a plurality of movable sections, a spring connecting said sections and normally tending to move one of said sections to closed position and the other of said sections to open position, an actuating member intermediate of said sections movable in opposite directions to positively actuate said sections to move the same in opposition to said spring to the other of the positions thereof, and a spring of greater strength than said first named spring acting on said actuating member, and serving to normally maintain said actuating member in engagement with the section biased towards closed position by the other of said springs.

9. A radiator shutter comprising a frame, a plurality of pivoted vanes mounted to turn from a vertical to a horizontal plane in moving from closed to open position, said vanes being grouped into an upper and a lower section, links interconnecting the vanes of each section so that said vanes may be operated in unison, each link being provided near its top with a lug, a spring interconnecting said links by being hooked over said lugs, a vertically movable slidebar, a spring connected at one end to the lower end of said slidebar and at the other end to the radiator shutter frame, said last named spring exerting a downward pull on said slidebar, and abutments or shoulders on each end of said slidebar to control the movement of said links by contacting with and exerting pressure against the link lugs, whereby the shutter sections controlled by said links are moved or permitted to be moved into open or closed position depending on the direction in which the slidebar is moved.

10. A radiator shutter comprising a frame provided on its inner face with vertical flanges, one on each side of said frame, a plurality of vanes extending horizontally across said frame and pivoted in said flanges, said vanes being grouped into a lower section and an upper section, a link for each section and having connected thereto each of the vanes of said group to operate said vanes in unison, and operating means for said sections including a spring interconnecting the links of both sections, and a vertically slidable spring-tensioned bar provided on its ends with abutments, whereby upon progressive upward movement of said slidebar first the lower and then the upper section is successively closed, and upon progressive downward movement of said slidebar first the upper section and then the lower section is successively opened.

11. A radiator shutter comprising a frame provided on its inner face with vertical flanges, one on each side of said frame, a plurality of vanes arranged horizontally across said frame and pivoted in said flanges, said vanes being grouped into two sections, one in the lower part of said frame and the other in the upper part of said frame, a link for each section and having connected thereto each of the vanes of said section to operate said vanes in unison, and operating means for said sections including a spring interconnecting the links of both sections and a vertically slidable bar, a spring exerting a downward pull upon said slidebar, abutments provided on the ends of said slidebar, whereby upon progressive upward movement of said slidebar, said springs and abutments move first the lower and then the upper sections successively into closed position and upon progressive downward movement of said slidebar, said springs and abutments move first the upper and then the lower sections successively into open position, and a single control means for actuating said slidebar.

12. In a radiator shutter a frame, a substantially vertical channel member on each side of said frame, shutter vanes, pins pivotally mounting said vanes in a wall of said channel members, link bars so fastened to said vanes that same turn pivotally in two sections, a coil spring in the channel of said channel member and connecting said link bars, a slidebar, a coil spring connecting said slidebar to the frame, a cable attached to said slidebar and adapted for manual actuation thereof against the tension of said spring, shoulders on said slidebar adapted to hold down the lower link bar when said slidebar is in the lower half of its locus and to hold up the upper link bar when said slidebar is in the upper half of its locus.

13. A radiator shutter comprising a plurality of movable sections, means tending to move one of said sections to open position and the other of said sections to closed position, and an actuating member therefor movable in opposite directions intermediate of said sections to positively actuate said sections to the other of the positions thereof; said actuating member being disposed in the intermediate position thereof in disengaged relation to said sections.

In testimony whereof, I have signed my name hereto.

HARLOW T. STOKES.